May 22, 1962 F. W. SCOTT 3,035,840

PHONOGRAPH RECORD

Filed Jan. 31, 1961

INVENTOR.

FRED W. SCOTT

BY Hall & Houghton

ATTORNEYS 3,035,840
PHONOGRAPH RECORD
Fred W. Scott, North Garden, Va.
Filed Jan. 31, 1961, Ser. No. 86,095
4 Claims. (Cl. 274—42)

The present invention relates to phonograph records, and has particular reference to improved types of records adaptable to being clasped and lifted from a surface by two or three fingers of one's hand, in which the records are received by standard diameter spindles.

Manufacturers of the various types of phonograph records generally urge the users not to touch the grooves or groove portion of a record, but direct that the record should be handled from its outer edges. This is usually accomplished until it is necessary to re-insert the record into a container or envelope for the record, when more than two hands would be required to do such a feat.

The present invention is directed to providing at least two openings in the central portion of a record with each opening having an interior flanged lip or other fingernail engaging means so that at least two fingers may clasp the record so that it may be readily lifted. By lifting the record and holding it in this manner, it is possible to place or re-insert the record into a container or envelope.

The invention provides a new and improved phonograph record having a central label area, a sound recording and reproducing area peripheral thereto, a spindle hole in the center of the record, a deep groove between the label area and the sound recording and reproducing area to keep the phonograph needle from entering the central label area, and at least two openings for inserting the fingers so that the fingernail thereof engage a ledge or flange, thereby enabling the record to be clasped and lifted or held by these fingers.

Perhaps the outstanding advantage of the new phonograph record resides in a new construction, effectively and efficiently fulfilling its intended purpose, simple in design and construction, and allows the record to be conveniently handled by one hand without fingering or otherwise lending damage to the sound recording and reproducing area of the record.

Other objects and advantages will be apparent from a detailed description of the invention and from the appended drawings and claims.

Figure 1:
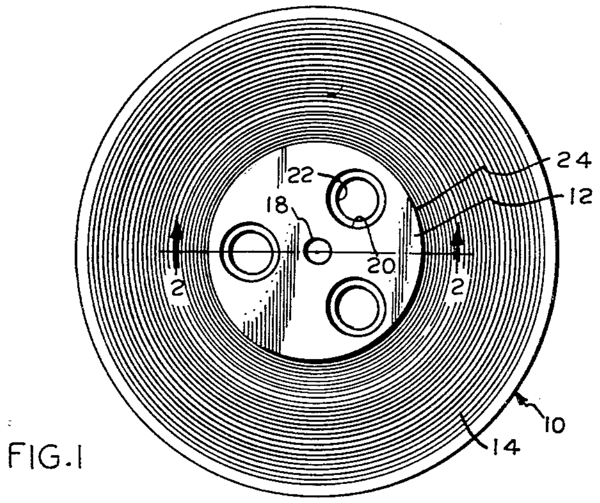
FIG. 1 is a plan view of a phonograph record embodying the present invention.
Figure 2:
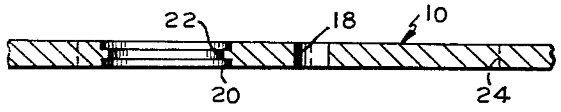
FIG. 2 is a detail cross-sectional view taken along lines 2—2 of FIG. 1 and showing a flanged lip portion of the finger-receiving openings.

Referring now to the drawing there is illustrated a phonograph record 10 having at least a central label-attaching area of portion 12 and a sound recording and reproducing portion 14 being peripheral to the central portion.

The phonograph record may conveniently be provided with respective marginal areas or zones interior and exterior of the sound recording and reproducing portion, but such are not shown herein.

In the central portion 12 of the disc record there is a small sized center hole 18 for receiving the usual spindle (not shown).

Within the remaining area of the central portion are at least two finger-receiving openings 20, 20, each of a size to permit passage of a finger therethrough. These openings in the form shown are two of a larger number, e.g. three, of said finger receiving openings. Along the edges of the openings 20 is provided a fingernail receiving or engaging element shown as a ledge or flanged-element 22.

The openings 20, 20 may be formed or punched during the manufacture of the record. These openings may be substantially ¾" to 1¼" in diameter, and may be conveniently positioned equidistant from the center hole as well as positioned equidistant from each other, according to a predetermined pattern.

Upper and lower edges of each of these openings form an opening of a larger diameter, so that there is formed the internal flanged element along the circumferential portion of the openings. The flanged element is adapted to receive and engage with the finger and fingernail so that the finger may clasp the record and allow it to be lifted and held by these fingers.

Between the central label-attaching portion and the sound recording portion, there is a continuous deep dead groove 24 for receiving and allowing travel therealong of a phonograph needle. The dead groove prevents the phonograph needle from reaching the finger-receiving openings so that no damage is done to the record of phonograph needle.

Figure 3:
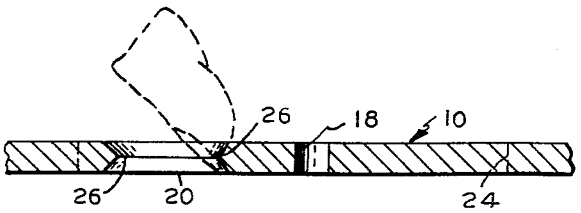
FIG. 3 is a detail cross-sectional view of a modification of the embodiment shown in FIG. 2.

A modification of the present invention is shown in FIGURE 3 wherein an interiorly projecting, angularly cross-sectioned portion 26 is formed for similarly receiving the engagement of the fingernail portion of a finger inserted within the opening 20. The finger and fingernail for engaging the portion 26 is shown in phantom lines in FIG. 3.

In another feature of the present invention, a plurality of records in a stacked array having their respective finger-receiving openings in alignment provides that the stacked array can be simply lifted with at least two fingers. With the spindle hole or center opening of each record also in alignment, the stacked array may be readily dropped or lowered onto an elongated spindle in one operation rather than by placing each record on the spindle.

It will be thus apparent that the new and improved phonograph record is particularly adaptable to being clasped and readily lifted and held from a surface by the fingers of one hand, and this is accomplished without damaging or otherwise physically contacting the recording and sound reproducing zone or area of the phonograph record.

Preferred embodiments of the invention have been described. Various changes and modifications however may be made within the scope of the invention as set forth in the appended claims.

What is claimed is:

1. A phonograph disc record comprising on at least one face thereof a central, non-recording portion and a recording portion peripherally spaced therearound, said central portion having a centrally disposed spindle aperture and at least two finger receiving apertures in peripherally spaced relationship to one another and to said spindle aperture, said finger receiving apertures having a diameter intermediate the opposed faces of said record less than the diameter of the apertures at the opposed faces of said record, said diameters decreasing successively.

2. A phonograph record according to claim 1, there being a sharp abutment between said larger and smaller diameter portions.

3. A phonograph record according to claim 1, there being a bevelled surface between said larger and smaller diameter portions.

4. A phonograph record according to claim 1, said bevelled surfaces meeting at said portion of smaller diameter.

References Cited in the file of this patent

UNITED STATES PATENTS

| | | |
|---|---|---|
| 1,391,637 | Kiffe | Sept. 20, 1921 |
| 1,471,862 | Reinhold | Oct. 23, 1923 |
| 2,285,139 | Andres | June 2, 1942 |
| 2,309,276 | Roberts | Jan. 26, 1943 |